(12) United States Patent
Lee et al.

(10) Patent No.: US 9,225,015 B2
(45) Date of Patent: Dec. 29, 2015

(54) LITHIUM AIR BATTERY

(75) Inventors: Dong-joon Lee, Yongin-si (KR); Dong-min Im, Seoul (KR); Young-gyoon Ryu, Suwon-si (KR); Victor Roev, Suwon-si (KR); Min-sik Park, Hwaseong-si (KR); Sang-bok Ma, Yongin-si (KR)

(73) Assignee: SAMSUNG ELECTRONICS CO., LTD. (KR)

( * ) Notice: Subject to any disclaimer, the term of this patent is extended or adjusted under 35 U.S.C. 154(b) by 194 days.

(21) Appl. No.: 13/562,387

(22) Filed: Jul. 31, 2012

(65) Prior Publication Data
US 2013/0137002 A1    May 30, 2013

(30) Foreign Application Priority Data
Nov. 30, 2011   (KR) .......................... 10-2011-0127222

(51) Int. Cl.
*H01M 4/40*   (2006.01)
*H01M 4/38*   (2006.01)
*H01M 12/06*  (2006.01)

(52) U.S. Cl.
CPC .............. *H01M 4/382* (2013.01); *H01M 12/06* (2013.01); *H01M 2300/0028* (2013.01)

(58) Field of Classification Search
CPC ....................................................... H01M 4/40
See application file for complete search history.

(56) References Cited

U.S. PATENT DOCUMENTS

| | | | |
|---|---|---|---|
| 2007/0243449 A1 | 10/2007 | Sotomura et al. | |
| 2010/0129723 A1* | 5/2010 | Noda et al. | 429/324 |
| 2012/0028137 A1* | 2/2012 | Chase et al. | 429/405 |

FOREIGN PATENT DOCUMENTS

| | | | |
|---|---|---|---|
| JP | 2004-319324 | * | 11/2004 |
| JP | 2005-026023 | | 1/2005 |
| JP | 2009-230981 A | | 10/2009 |
| WO | WO 2011/133982 | * | 10/2011 |

OTHER PUBLICATIONS

JP, 2000-021444 (MT).*
Alt et. al "Quinones as rechargeable and regenerable battery cathode and materials", Journal of the Electrochemical Society (1971),118(12), 1950-3.*
JP, 2004-319324 (MT).*
H. Alt, et al., *Quinones as Rechargeable and Regenerable Battery Cathode Materials*, Dec. 1971, vol. 118, issue 12, pp. 1950-1953.

* cited by examiner

*Primary Examiner* — Patrick Ryan
*Assistant Examiner* — Alex Usyatinsky
(74) *Attorney, Agent, or Firm* — Cantor Colburn LLP

(57) ABSTRACT

A lithium air battery including a negative electrode comprising lithium, a positive electrode using oxygen as a positive active material, and an organic electrolyte including an organic compound capable of intercalating and deintercalating electrons involved in an electrochemical reaction.

21 Claims, 1 Drawing Sheet

LITHIUM AIR BATTERY

CROSS-REFERENCE TO RELATED APPLICATION

This application claims the benefit of Korean Application No. 10-2011-0127222 filed Nov. 30, 2011, in the Korean Intellectual Property Office, the disclosure of which is incorporated herein by reference.

BACKGROUND

1. Field

Aspects of the present invention relate to lithium air batteries.

2. Description of the Related Art

A lithium air battery generally includes a negative electrode capable of intercalating and deintercalating lithium ions, a positive electrode that oxidizes and reduces oxygen present in the air, and an electrolyte interposed between the negative electrode and the positive electrode.

In the lithium air battery, lithium is used as a negative electrode and air, as a positive active material, does not need to be stored therein. Thus, a lithium air battery with a high capacity may be obtained. Lithium air batteries have a theoretical energy density of 3,500 Wh/kg or greater, which is approximately 10 times greater than that of lithium ion batteries.

However, existing lithium air batteries have significantly lower energy efficiency than that of lithium ion batteries. This is due to the polarization caused by the high overvoltage during the charging and the discharging.

To lower the charge-discharge overvoltage, various kinds of catalysts have been used, but the reducing effects have been insufficient. Therefore, there is still a need to develop a method of improving charge-discharge energy efficiency by reducing the charge-discharge overvoltage.

SUMMARY

Aspects of the present invention provide lithium air batteries with significantly improved energy efficiency due to a reduction in charge-discharge overvoltage.

According to an aspect of the present invention, a lithium air battery includes a negative electrode including lithium, a positive electrode using oxygen as a positive active material, and an organic electrolyte, wherein the organic electrolyte includes an organic compound capable of intercalating and deintercalating electrons involved in an electrochemical reaction.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION

Figure 1:
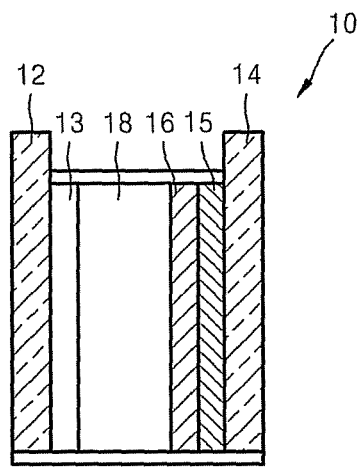
FIG. 1 is a schematic diagram illustrating the structure of the lithium air battery according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures. As used herein, the term "and/or" includes any and all combinations of one or more of the associated listed items. Expressions such as "at least one of," when preceding a list of elements, modify the entire list of elements and do not modify the individual elements of the list.

Hereinafter, exemplary embodiments of a lithium air battery will be described in detail.

According to an embodiment of the present invention, a lithium air battery includes a negative electrode including lithium, a positive electrode using oxygen as a positive active material, and an organic electrolyte including an organic compound capable of intercalating and deintercalating electrons involved in an electrochemical reaction.

The lithium air battery may use an aqueous electrolyte or an organic electrolyte. When the lithium air battery uses an organic electrolyte, the reaction mechanism may be represented by Chemical Equation 1 below:

$$4Li + O_2 \leftrightarrow 2Li_2O \quad E° = 2.91\,V$$

$$2Li + O_2 \leftrightarrow Li_2O_2 \quad E° = 3.10\,V \qquad \text{<Chemical Equation 1>}$$

During the discharging, lithium derived from the negative electrode reacts with oxygen introduced from the positive electrode to generate a lithium oxide, and oxygen is reduced (oxygen reduction reaction (ORR)). In contrary, during the charging, the lithium oxide is reduced, and oxygen is generated by oxidation (oxygen evolution reaction (OER)).

During the discharging, $Li_2O_2$ is deposited in pores of the positive electrode, and the capacity of the lithium air battery depends on the amount of the deposited $Li_2O_2$ that fills the pores of the positive electrode. On the other hand, during the charging, the deposited $Li_2O_2$ is not easily oxidized and thus an overvoltage is applied thereto. To reduce the overvoltage, a catalyst material is generally introduced into the positive electrode.

The electrolyte of the lithium air battery includes an organic compound, and thus, the lithium air battery may have an increased capacity and a reduced charge-discharge polarization (charging voltage-discharging voltage).

The organic compound included in the organic electrolyte has an electrode reaction. Thus, the electrode reaction may be extended to a reaction at the interface between an electrode and the organic compound and a reaction at the interface between the organic compound and $Li_2O_2$.

In addition, as properties of the interface change, the resistance thereof changes. Therefore, an overvoltage during the charging and the discharging may be significantly reduced by a sharp increase in the electrode reaction rate. That is, the overvoltage may be drastically reduced since a reversible electrode reaction is possible.

The organic compound is capable of intercalating and deintercalating electrons involved in the electrochemical reaction, and may form a redox couple by oxidation-reduction reactions accompanied by intercalation and deintercalation of these electrons. That is, the organic compound may be involved in the electron transfer of the electrode reaction while the organic compound repeatedly switches between an oxidized state and a reduced state.

The organic compound and the organic electrolyte including the organic compound may act as a mediator that partially or completely mediates the electron transfer between the positive electrode and a lithium oxide during the discharging. The lithium oxide, for example may be $Li_2O$, $Li_2O_2$, or the like. The lithium oxide used herein refers to any kind of lithium oxide including lithium and at least one oxygen.

The reduction potential of the organic compound is in the range of about 2.5 to about 3.5 V with respect to lithium metal and may be within the charge-discharge voltage range of the lithium air battery. That is, during the discharging of the lithium air battery, reduction and oxidation of the organic compound may occur. The organic compound may be any organic compound regardless of its chemical structure as long as it has a reduction potential within the charge-discharge voltage range of the lithium air battery, for example, within the range from about 2.5 to about 3.5 V with respect to lithium metal and maintains a stable state in the organic electrolyte.

Hereinafter, a mechanism of the organic compound and the organic electrolyte including the organic compound involved in electron transfer during the charging and the discharging will be described in more detail. However, the example is provided only for convenience of understanding and the present invention should not be construed as being limited thereto.

During the discharging of the lithium air battery, the organic compound is first oxidized by receiving electrons from the positive electrode at a lower voltage as compared to the lithium oxide. Subsequently, the reduced organic compound transfers electrons to the oxygen molecules dissolved in the organic electrolyte and the primary lithium oxide and thus is oxidized so that an original organic compound is generated. The oxygen molecules and the lithium oxide that have received electrons from the reduced organic compound react with each other to form an oxygen reduction product or a secondary lithium oxide. Then, the generated organic compound receives electrons from the positive electrode and is reduced again. Since the organic compound mediates the electron transfer as described above, the moving distance of the oxygen supplied from the air and the generated primary lithium oxide to an electrode is shortened. Therefore, the average discharge voltage during the discharging may increase.

In addition, the organic compound may stabilize the surface of a lithium oxide through interaction by weakly bonding to the surface of a lithium oxide such as $Li_2O_2$. For example, a terminal oxygen of 1,4-benzoquinone or a terminal cyano group of 7,7,8,8-tetracyanoquinodimethane may be weakly bonded to the lithium of $Li_2O_2$. Since the surface of the lithium oxide is stabilized, the average charge voltage during the charging may be reduced.

The organic compound may include a double bond and/or a triple bond in the molecules. Examples of the double bond include a carbon-carbon double bond, a carbon-oxygen double bond, and a nitrogen-nitrogen double bond. The triple bond may be, for example, a carbon-nitrogen triple bond. However, the double bond and the triple bond are not limited to the above examples, and may be any double bond and/or triple bond known in the art.

In addition, the organic compound may include a conjugated system. The conjugated system used herein refers to an overlapping system of continuously connected p-orbitals by having alternating double and single bonds. The continuously connected p-orbitals can be used by contiguous atoms. The conjugated system allows the delocalization of pi-electrons. The delocalization of pi-electrons allows the compound including the conjugated system to be stabilized. Thus, the compound having the conjugated system may be maintained in a stable state during oxidation and/or reduction. For example, the organic compound may be benzene or thiophene.

The organic compound may be a quinone-based compound. The quinone-based compound may be quinone or a derivative thereof. The term "derivative" used herein refers to a structure in which at least one substituent is linked to the above-described compounds, and the substituent may be at least one element and/or compound selected from the group consisting of —F; —Cl; —Br; —CN; —$NO_2$; —OH; a $C_1$-$C_{60}$ alkyl group that is substituted or unsubstituted with —F, —Cl, —Br, —CN, —$NO_2$, or —OH; a $C_5$-$C_{60}$ cycloalkyl group that is substituted or unsubstituted with a $C_1$-$C_{60}$ alkyl group, —F, —Cl, —Br, —CN, —$NO_2$, or —OH; a $C_2$-$C_{60}$ heterocycloalkyl group that is substituted or unsubstituted with a $C_1$-$C_{60}$ alkyl group, —F, —Cl, —Br, —CN, —$NO_2$, or —OH; a $C_5$-$C_{60}$ aryl group that is substituted or unsubstituted with a $C_1$-$C_{60}$ alkyl group, —F, —Cl, —Br, —CN, —$NO_2$, or —OH; and a $C_2$-$C_{60}$ heteroaryl group that is substituted or unsubstituted with a $C_1$-$C_{60}$ alkyl group, —F, —Cl, —Br, —CN, —$NO_2$, or —OH.

The $C_5$-$C_{60}$ aryl group used herein refers to a monovalent group having an aromatic hydrocarbon ring system and includes at least two ring systems, wherein the at least two ring systems are attached to each other or fused with each other. The $C_2$-$C_{60}$ heteroaryl group used herein refers to a group in which at least one carbon atom of the aryl group is substituted with at least one element selected from the group consisting of N, O, S, and P. The $C_5$-$C_{60}$ cycloalkyl group used herein refers to an alkyl group having a ring system, and the $C_2$-$C_{60}$ heterocycloalkyl group used herein refers to a group in which at least one carbon atom of the cycloalkyl group is substituted with at least one element selected from the group consisting of N, O, S, and P. The fused aromatic ring or the fused heteroaromatic ring is present in the fused form with the major ring and may include at least two ring systems. In this regard, the at least two ring systems may be attached to each other or fused with each other. The heteroaromatic ring refers to a ring in which at least one carbon atom of the aromatic ring is substituted with at least one element selected from the group consisting of N, O, S, and P.

For example, the organic compound may be the quinone-based compound represented by Formulae 1 or 2 below:

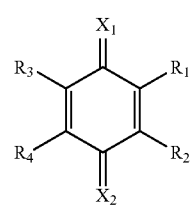

<Formula 1>

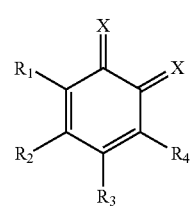

<Formula 2> wherein $X_1$ and $X_2$ are each independently oxygen or —$C(R_a)(R_b)$—, and $R_1$, $R_2$, $R_3$, $R_4$, $R_a$, and $R_b$ are each independently hydrogen, a halogen, a cyano group, or a $C_1$-$C_{10}$ alkyl group that is or is not substituted with hydrogen, a halogen, or a cyano group.

In Formula 1, $R_1$ and $R_2$, and $R_3$ and $R_4$ may be optionally each linked to each other to form an additionally fused ring. In Formula 2, $R_1$ and $R_2$, $R_2$ and $R_3$, and $R_3$ and $R_4$ may be optionally linked to each other to form an additionally fused ring.

For example, the organic compound may be at least one compound selected from the group consisting of 1,2-benzoquinone, 1,4-benzoquinone, 1,2-naphthoquinone, 2,3-naphthoquinone, 1,4-naphthoquinone, 1,2-anthraquinone, 2,3-anthraquinone, 1,4-anthraquinone, 9,10-anthraquinone, 1,2-pyrenedione, 4,5-pyrenedione, 1,2-coronenedione, 1,2,5,6-coronenetetranone, 1,2,5,6,9,10-coronenehexanone, tetrachloro-p-benzoquinone (chloranil), 2-hydroxy-1,4-naphthoquinone (lawsone), 2,3-dichloro-5,6-dicyano-1,4-benzoquinone (DDQ), tetrafluoro-1,4-benzoquinone, 7,7,8,8-tetracyanoquinodimethane, and 2,3,5,6-tetrafluoro-7,7,8,8-tetracyanoquinodimethane.

The amount of the organic compound in the organic electrolyte may be in the range of about 0.01 mM to about 5 M, for example, about 0.1 mM to about 0.5 M, but is not limited thereto. For example, the amount of the organic compound in the organic electrolyte may be within any range in which the organic electrolyte may effectively transfer electrons during the charging and the discharging.

In the lithium air battery, the organic electrolyte may include an aprotic solvent. The aprotic solvent may be a carbonate-based solvent, an ester-based solvent, an ether-based solvent, a ketone-based solvent, or an alcohol-based solvent. Examples of the carbonate-based solvent include dimethyl carbonate (DMC), diethyl carbonate (DEC), dipropyl carbonate (DPC), methyl propyl carbonate (MPC), ethyl propyl carbonate (EPC), ethyl methyl carbonate (EMC), ethylene carbonate (EC), propylene carbonate (PC), and butylene carbonate (BC). Examples of the ester-based solvent include methyl acetate, ethyl acetate, n-propyl acetate, dimethylacetate, methyl propionate, ethyl propionate, γ-butyrolactone, decanolide, valerolactone, mevalonolactone, and caprolactone. Examples of the ether-based solvent include dibutyl ether, tetraglyme, diglyme, dimethoxyethane, 2-methyltetrahydrofuran, and tetrahydrofuran. For example, the ketone-based solvent may be cyclohexanone. Examples of the alcohol-based solvent include ethyl alcohol and isopropyl alcohol. However, the aprotic solvent is not limited to the above examples, and any organic solvent known in the art may be used.

Examples of the organic solvent include: nitriles such as R—CN, where R is a linear, branched, or cyclic $C_2$ to $C_{20}$ hydrocarbon group and has a double-bond aromatic ring or ether bond; amides such as dimethylformamide; dioxolanes such as 1,3-dioxolane; and sulfolanes.

The organic solvent may be used alone or in combination. If the organic solvents are used in combination, a mixed ratio may be appropriately adjusted according to the desired performance of the battery to be manufactured and may be obvious to one of ordinary skill in the art.

The organic electrolyte may include an ionic liquid. Examples of the ionic liquid include linear or branched, substituted compounds containing cations such as ammonium, imidazolium, pyrrolidinium, and piperidinium, and anions such as $PF_6^-$, $BF_4^-$, $CF_3SO_3^-$, $(CF_3SO_2)_2N^-$, $(C_2F_5SO_2)_2N^-$, $(C_2F_5SO_2)_2N^-$, and $(CN)_2N^-$.

The organic electrolyte may include at least one of an alkali metal salt and an alkali earth metal salt. The at least one of the alkali metal salt and the alkali earth metal salt is dissolved in an organic solvent and acts as a source of at least one of the alkali metal ions and the alkali earth metal ions in the lithium air battery. The salt may facilitate migration of the alkali metal ions and/or alkali earth metal ions between the positive and negative electrodes.

For example, cations of the alkali metal salt and/or the alkali earth metal salt may include lithium ions, sodium ions, magnesium ions, potassium ions, calcium ions, rubidium ions, strontium ions, cesium ions, barium ions, and the like. Anions of the alkali metal salt and/or alkali earth metal salt in the organic electrolyte may be at least one anion selected from the group consisting of $PF_6^-$, $BF_4^-$, $SbF_6^-$, $AsF_6^-$, $C_4F_9SO_3^-$, $ClO_4^-$, $AlO_2^-$, $AlCl_4^-$, $C_xF_{2x+1}SO_3^-$ where x is a natural number, $(C_xF_{2x+1}SO_2)(C_yF_{2y+1}SO_2)N^-$ where x and y are natural numbers, and a halide.

For example, the alkali metal salt and/or alkali earth metal salt may be, but are not limited to, at least one compound selected from the group consisting of $LiPF_6$, $LiBF_4$, $LiSbF_6$, $LiAsF_6$, $LiN(SO_2C_2F_5)_2$, $Li(CF_3SO_2)_2N$, $LiC_4F_9SO_3$, $LiClO_4$, $LiAlO_2$, $LiAlCl_4$, $LiN(C_xF_{2x+1}SO_2)(C_xF_{2y+1}SO_2)$ where x and y are natural numbers, LiF, LiBr, LiCl, LiI, and $LiB(C_2O_4)_2$(LiBOB; lithium bis(oxalato)borate). Any alkali metal salts and alkali earth metal salts available in the art may be used.

In the organic electrolyte, the amount of the at least one of the alkali metal salt and the alkali earth metal salt may be from about 100 mM to about 10 M, for example, from about 500 mM to about 2 M. The amount of the at least one of the alkali metal salt and the alkali earth metal salt is not particularly limited, as long as the organic electrolyte may effectively transfer electrons during charging and discharging.

In the lithium air battery, a material for the negative electrode including lithium may be Li metal, an Li metal-based alloy, or a material capable of intercalating and deintercalating lithium, but is not limited thereto. However, for a negative electrode, any material which may be used in the art that includes lithium or is capable of intercalating and deintercalating lithium may be used. The negative electrode determines the capacity of the lithium air battery and thus the negative electrode may be, for example, lithium metal. For example, the lithium metal-based alloy may be an alloy of lithium with aluminum, tin, magnesium, indium, calcium, titanium, or vanadium.

The positive electrode, which uses oxygen as a positive active material, may be formed of a conductive material. The conductive material may be porous. Thus, any positive electrode material with porosity and conductivity may be used without limitation. For example, porous carbon-based materials may be used. Examples of a carbon-based material include carbon black, graphite, graphene, activated carbon, carbon fibers, and combinations thereof. Metallic conductive materials, including metal fibers and metal meshes, may be used. Metal powders including copper, silver, nickel, aluminum, and the like may be used. Organic conductive materials, such as polyphenylene derivatives, may be used. The above-described conductive materials may be used alone or in combination.

A catalyst for oxidation/reduction of oxygen may be added to the positive electrode. Examples of the catalyst include precious metal-based catalysts such as platinum, gold, silver, palladium, ruthenium, rhodium, and osmium; oxide-based catalysts such as a manganese oxide, an iron oxide, a cobalt oxide, and a nickel oxide; and organometallic catalysts such as cobalt phthalocyanine. However, the catalyst is not limited to the above examples and any catalysts for oxidation/reduction of oxygen which are known in the art may be used.

The catalyst may be supported on a catalyst support. The catalyst support may be an oxide, zeolite, clay-based minerals, or carbon. The oxide may be at least one oxide selected from the group consisting of alumina, silica, zirconium oxide, and titanium dioxide or an oxide including at least one metal selected from the group consisting of cerium (Ce), praseodymium (Pr), samarium (Sm), europium (Eu), terbium (Tb), thulium (Tm), ytterbium (Yb), antimony (Sb), bismuth (Bi), vanadium (V), chromium (Cr), manganese (Mn), iron (Fe), cobalt (Co), nickel (Ni), copper (Cu), niobium (Nb), molybdenum (Mo), and tungsten (W). Examples of the carbon include amorphous carbons such as carbon black, acetylene black, channel black, and lamp black; graphite such as natural graphite, artificial graphite, and expandable graphite; activated carbon; and carbon fibers. However, the catalyst support is not limited to the above examples and any catalyst support known in the art may be used.

The positive electrode may further include a binder. The binder may include a thermoplastic resin or a thermosetting resin. Examples of the binder include, but are not limited to, polyethylene, polypropylene, polytetrafluoroethylene (PTFE), polyvinylidene fluoride (PVDF), styrene-butadiene rubber, a tetrafluoroethylene-perfluoroalkylvinylether copolymer, a vinylidene fluoride-hexafluoropropylene copolymer, a vinylidene fluoride-chlorotrifluoroethylene copolymer, an ethylene-tetrafluoroethylene copolymer, polychlorotrifluoroethylene, a vinylidene fluoride-pentafluoro propylene copolymer, a propylene-tetrafluoroethylene copolymer, an ethylene-chlorotrifluoroethylene copolymer, a vinylidene fluoride-hexafluoropropylene-tetrafluoroethylene copolymer, a vinylidene fluoride-perfluoromethylvinylether-tetrafluoro ethylene copolymer, and an ethylene-acrylic acid copolymer. The binder materials listed may be used alone or in combination. However, any binder available in the art may be used.

The positive electrode may be manufactured as follows. The catalyst for oxidation/reduction of oxygen, a conductive material, and a binder are mixed and an appropriate solvent is added thereto to prepare a positive electrode slurry. The positive electrode slurry is coated on a surface of a current collector and the coated current collector is then dried, optionally followed by press-molding to improve electrode density, thereby completing the manufacture of the positive electrode. The positive electrode may selectively include a lithium oxide. The catalyst for oxidation/reduction of oxygen may or may not be used.

A porous body in a matrix or mesh form may be used as the current collector to facilitate diffusion of oxygen. A porous metal plate made of, for example, stainless steel, nickel, or aluminum may be used. Materials for the current collector are not particularly limited, and any material for current collectors known in the art may be used. The current collector may be coated with an anti-oxidative metal or alloy to prevent oxidation.

The lithium air battery may include a separator disposed between the positive electrode and the negative electrode. The separator is not particularly limited as long as it has a composition that can withstand service conditions of the lithium air battery. Examples of the separator include polymer nonwoven fabrics such as polypropylene nonwoven fabrics and polyphenylene sulfide nonwoven fabrics; and porous films composed of olefin resins such as polyethylene and polypropylene. These materials may also be used in combination.

In addition, a lithium ion conductive solid electrolyte membrane may be disposed between the negative electrode and the organic electrolyte. The lithium ion conductive solid electrolyte membrane may serve as a protective layer preventing water contained in an aqueous electrolyte and impurities, such as oxygen, from directly reacting with lithium contained in the negative electrode. A material for the lithium ion conductive solid electrolyte membrane may be an inorganic material, for example, lithium ion conductive glass, lithium ion conductive crystal (ceramic or glass-ceramic), or a mixture thereof. However, the electrolyte membrane material is not limited to the above examples and any material known in the art for a solid electrolyte membrane which has lithium ion conductivity and can protect the negative electrode may be used.

In terms of chemical stability, the lithium ion conductive solid electrolyte membrane may be formed of an oxide. The lithium ion conductive crystal may be $Li_{1+x+y}(Al, Ga)_x(Ti, Ge)_{2-x}Si_yP_{3-y}O_{12}$, where $0 \leq x \leq 1$ and $0 \leq x \leq 1$, for example, $0 \leq x \leq 0.4$ and $0 \leq y \leq 0.6$, for example, $0.1 \leq x \leq 0.3$, and $0.1 \leq y \leq 0.4$. Examples of the lithium ion conductive glass-ceramic include lithium-aluminum-germanium-phosphate (LAGP), lithium-aluminum-titanium-phosphate (LATP), lithium-aluminum-titanium-silicon-phosphate (LATSP), and the like.

In some embodiments, the lithium ion conductive solid electrolyte membrane may further include a polymer solid electrolyte, in addition to the glass-ceramic. The polymer solid electrolyte may be polyethylene oxide doped with a lithium salt. Examples of the lithium salt include $LiN(SO_2CF_2CF_3)_2$, $LiBF_4$, $LiPF_6$, $LiSbF_6$, $LiAsF_6$, $LiClO_4$, $LiCF_3SO_3$, $LiN(SO_2CF_3)_2$, $LiN(SO_2C_2F_5)_2$, $LiC(SO_2CF_3)_3$, $LiN(SO_3CF_3)_2$, $LiC_4F_9SO_3$, $LiAlCl_4$, and the like.

The lithium ion conductive solid electrolyte membrane may further include an inorganic solid electrolyte, in addition to the glass-ceramic. Examples of the inorganic solid electrolyte include $Cu_3N$, $Li_3N$, LiPON, and the like.

A separator may be further disposed between the lithium ion conductive solid electrolyte membrane and the negative electrode.

The lithium air battery may have a charge-discharge capacity efficiency of 25% or greater, for example, 45% or greater, for example, 70% or greater, for example, 80% or greater, for example, 85% or greater, for example, 90% or greater. The charge-discharge capacity efficiency thereof is calculated from discharge capacity, charge capacity, the average charging voltage, and the average discharging voltage that are obtained by performing a one-cycle charge and discharge of the lithium air battery at 60° C. and 1 atm in a constant current of 1 mA/cm² at a voltage of about 2 to about 4.7 V by using Equation 1 below:

Charge-discharge capacity efficiency [%]=(charge capacity)/(discharge capacity)×100, wherein the charge capacity indicates a charge capacity at a cut-off voltage of 4.7 V during the charging, and the discharge capacity indicates a discharge capacity at a cut-off voltage of 2.0 V during the discharging. <Equation 1>

The lithium air battery may have a charge-discharge capacity efficiency of 25% or greater even though it does not include a catalyst for oxidation/reduction of oxygen such as precious metal, a metal oxide, or the like. Thus, the lithium air battery does not require the use of the catalyst for oxidation/reduction of oxygen, or the amount of the catalyst for oxidation/reduction of oxygen in the lithium air battery may be greatly reduced. In addition, the charge-discharge capacity efficiency of the lithium air battery may be further improved by including the catalyst for oxidation/reduction of oxygen. That is, the lithium air battery may have highly improved charge-discharge energy efficiency due to the involvement of the organic electrolyte in electron transfer during the charging and the discharging.

The lithium air battery may be manufactured as follows. First, a catalyst for oxidation/reduction of oxygen, a conductive material, and a binder are mixed, and an appropriate solvent is added thereto to prepare a positive electrode slurry. The positive electrode slurry is coated on a surface of a current collector, and the coated current collector is then dried, optionally followed by press-molding to improve electrode density, thereby completing the manufacture of the positive electrode. The catalyst for oxidation/reduction of oxygen may or may not be used.

Next, the negative electrode is mounted on one side of the case, and the positive electrode with the separator is mounted on the other side of the case, opposite to the negative electrode. The separator is disposed on the side of the positive electrode, facing the negative electrode. An electrolyte is injected between the positive electrode and the negative electrode, a porous current collector is disposed on the positive electrode, and a pressing member that allows air to reach the positive electrode applies pressure to fix the cell, thereby completing the manufacture of the lithium air battery. A lithium ion conductive solid electrolyte membrane may be further disposed on one surface of the negative electrode.

The case may be divided into upper and lower parts that contact the negative and positive electrodes, respectively. An insulating resin may be disposed between the upper and lower parts to electrically insulate the positive and negative electrodes from each other.

The lithium air battery may be either a lithium primary battery or a lithium secondary battery. The lithium air battery may be in various shapes, and in some embodiments, may have a coin, button, sheet, stack, cylinder, plane, or horn shape. The lithium air battery may be used as a large-scale battery for electric vehicles.

FIG. 1 is a schematic diagram illustrating a structure of a lithium air battery 10 according to an embodiment of the present invention. The lithium air battery 10 includes a positive electrode 15 using oxygen as an active material and disposed on a first current collector 14, a negative electrode 13 including lithium and contacting a second current collector 12, an organic electrolyte 18 disposed between the positive electrode 15 and the negative electrode 13, and a separator 16 disposed on one surface of the positive electrode 15. A lithium ion conductive solid electrolyte membrane (not shown) may be disposed on one surface of the negative electrode 13. A separator (not shown, or a polymer electrolyte membrane) impregnated in the organic electrolyte 18 may be disposed between the negative electrode 13 and the lithium ion conductive solid electrolyte membrane. The first current collector 14, which is porous, may serve as a gas diffusion layer. Also, a pressing member that allows air to reach the positive electrode 15 may be disposed on the first current collector 14.

As used herein, the term "air" is not limited to atmospheric air, and may refer to a combination of gases including oxygen, or pure oxygen gas. This broad definition of "air" also applies to other terms including "air battery" and "air electrode".

One or more embodiments of the present invention will now be described more fully with reference to the following examples. However, these examples are provided only for illustrative purposes and are not intended to limit the scope of the present invention.

<Preparation of an Organic Electrolyte>

PREPARATION EXAMPLE 1

An organic electrolyte was prepared by adding 1 M of Li(CF$_3$SO$_2$)$_2$N (Lithium bis(trifluoromethylsulphonyl)amine, LiTFSI) and 50 mM of p-benzoquinone represented by Formula 3 below to tetraethylene glycol dimethyl ether (TEGDME).

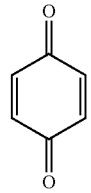

<Formula 3>

PREPARATION EXAMPLE 2

An organic electrolyte was prepared by adding 1 M of Li(CF$_3$SO$_2$)$_2$N (Lithium bis(trifluoromethylsulphonyl)amine, LiTFSI) and 300 mM of tetrafluoro-1,4-benzoquinone represented by Formula 4 below to TEGDME.

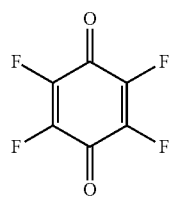

<Formula 4>

PREPARATION EXAMPLE 3

An organic electrolyte was prepared by adding 1 M of Li(CF$_3$SO$_2$)$_2$N (Lithium bis(trifluoromethylsulphonyl)amine, LiTFSI) and 25 mM of 7,7,8,8-tetracyanoquinodimethane represented by Formula 5 below to TEGDME.

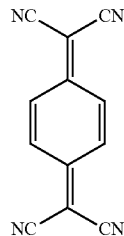

<Formula 5>

PREPARATION EXAMPLE 4

An organic electrolyte was prepared by adding 1 M of Li(CF$_3$SO$_2$)$_2$N (Lithium bis(trifluoromethylsulphonyl)amine, LiTFSI) and 100 mM of 2,3,5,6-tetrafluoro-7,7,8,8-tetracyanoquinodimethane represented by Formula 6 below to TEGDME.

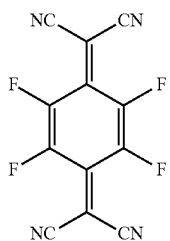

<Formula 6>

PREPARATION EXAMPLE 5

An organic electrolyte was prepared by adding 1 M of Li(CF$_3$SO$_2$)$_2$N (Lithium bis(trifluoromethylsulphonyl) amine, LiTFSI) and 10 mM of 1,2-benzoquinone to TEGDME.

PREPARATION EXAMPLE 6

An organic electrolyte was prepared by adding 1 M of Li(CF$_3$SO$_2$)$_2$N (Lithium bis(trifluoromethylsulphonyl) amine, LiTFSI) and 10 mM of 1,4-naphtoquinone to TEGDME.

PREPARATION EXAMPLE 7

An organic electrolyte was prepared by adding 1 M of Li(CF$_3$SO$_2$)$_2$N (Lithium bis(trifluoromethylsulphonyl) amine, LiTFSI) and 10 mM of 9,10-anthraquinone to TEGDME.

PREPARATION EXAMPLE 8

An organic electrolyte was prepared by adding 1 M of Li(CF$_3$SO$_2$)$_2$N (Lithium bis(trifluoromethylsulphonyl) amine, LiTFSI) and 10 mM of 4,5-pyrenedione to TEGDME.

COMPARATIVE PREPARATION EXAMPLE 1

An organic electrolyte was prepared by dissolving 1 M of Li(CF$_3$SO$_2$)$_2$N (Lithium bis(trifluoromethylsulphonyl) amine, LiTFSI) in TEGDME.

EXAMPLE 1

<Manufacturing of a Lithium Air Battery>

40 wt % of carbon (SUPER P® Li), 10 wt % of PTFE, and 50 wt % of N-methyl pyrrolidone (NMP) were mixed to prepare a positive electrode slurry, and the positive electrode slurry was then coated and rolled to obtain a positive electrode material sheet. The positive electrode material sheet was pressed on a stainless mesh and then dried in a vacuum oven at 100° C. for 120 minutes to obtain a positive electrode.

A negative electrode was prepared in such a manner that a hole with a size of 1 cm×1 cm was made in the center of a polypropylene-coated aluminum film with a size of 5 cm×5 cm (thickness: 200 im) and then closed by a LATP film with a size of 1.4 cm×1.4 cm (Li$_{1+x+y}$Al$_x$Ti$_{2-x}$Si$_y$P3$_{-y}$O$_{12}$, where 0≤x≤2 and 0≤y≤3, thickness: 150 im, manufactured by Ohara Corporation) to prepare an Al film that was partially formed of LATP.

Next, a new Al film with a size of 5 cm×5 cm, a Cu current collector (thickness: 20 im), an Li foil with a size of 1.4 cm×1.4 cm (thickness: 100 im), a CELGARD® 3501 separator impregnated with a PC solution of 1M LiTFSI and formed of polypropylene (thickness: 25 im, available from CELGARD® LLC), and the prepared Al film were sequentially stacked, vacuum-heated, and attached to one another, thereby obtaining an Al pouch-type protected lithium negative electrode.

The protected lithium negative electrode was mounted in a stainless steel case, and the positive electrode with a CELGARD® 3501 separator formed of polypropylene (thickness: 25 im, available from CELGARD® LLC) disposed on a surface thereof opposite to the negative electrode was set to face the negative electrode. Afterwards, the organic electrolyte, prepared according to the Preparation Example 1, was injected between the positive electrode and the negative electrode, a foamed nickel plate was disposed on the positive electrode, and a pressing member allowing air to reach the positive electrode was pressed thereon to fix a cell, thereby completing the manufacture of a lithium air battery.

The case may be divided into upper and lower parts that contact the negative and positive electrodes, respectively. An insulating resin may be disposed between the upper and lower parts to electrically insulate the positive and negative electrodes from each other.

EXAMPLE 2

A lithium air battery was manufactured in the same manner as in Example 1, except that the organic electrolyte prepared according to the Preparation Example 2 was used instead of the organic electrolyte of the Preparation Example 1.

EXAMPLE 3

A lithium air battery was manufactured in the same manner as in Example 1, except that the organic electrolyte prepared according to the Preparation Example 3 was used instead of the organic electrolyte of the Preparation Example 1.

EXAMPLE 4

A lithium air battery was manufactured in the same manner as in Example 1, except that the organic electrolyte prepared according to the Preparation Example 4 was used instead of the organic electrolyte of the Preparation Example 1.

EXAMPLE 5

A lithium air battery was manufactured in the same manner as in Example 1, except that the organic electrolyte prepared according to the Preparation Example 5 was used instead of the organic electrolyte of the Preparation Example 1.

EXAMPLE 6

A lithium air battery was manufactured in the same manner as in Example 1, except that the organic electrolyte prepared according to the Preparation Example 6 was used instead of the organic electrolyte of the Preparation Example 1.

EXAMPLE 7

A lithium air battery was manufactured in the same manner as in Example 1, except that the organic electrolyte prepared according to the Preparation Example 7 was used instead of the organic electrolyte of the Preparation Example 1.

EXAMPLE 8

A lithium air battery was manufactured in the same manner as in Example 1, except that the organic electrolyte prepared according to the Preparation Example 8 was used instead of the organic electrolyte of the Preparation Example 1.

COMPARATIVE EXAMPLE 1

A lithium air battery was manufactured in the same manner as in Example 1, except that the organic electrolyte prepared according to the Comparative Preparation Example 1 was used instead of the organic electrolyte of the Preparation Example 1.

EVALUATION EXAMPLE 1

Evaluation of the Charge/Discharge Characteristics

The lithium air batteries manufactured according to Examples 1 to 8 and the Comparative Example 1 were discharged at a constant current of 1 mA/cm$^2$ to a voltage of 2 V (with respect to Li), and charged at the same current to a voltage of 4.7 V. The charge/discharge test results are shown in Table 1 below and FIG. 2. A charge-discharge capacity efficiency during charging and discharging is defined by Equation 1 above.

Figure 2:
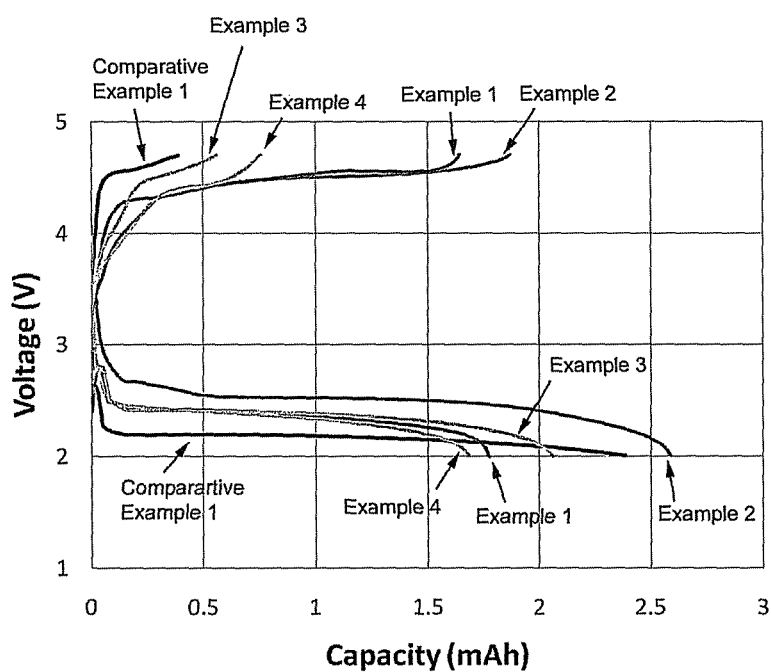
FIG. 2 is a graph showing the charge and the discharge test results of the lithium air batteries manufactured according to Examples 1 through 4 and the Comparative Example 1.

The discharging voltage indicates a voltage in the plateau region in the discharge curve of the charge-discharge curve illustrated in FIG. 2.

TABLE 1

|  | Discharging voltage [V] | Charge-discharge capacity efficiency [%] |
| --- | --- | --- |
| Comparative Example 1 | 2.17 | 16 |
| Example 1 | 2.33 | 93 |
| Example 2 | 2.51 | 72 |
| Example 3 | 2.39 | 27 |
| Example 4 | 2.32 | 45 |

As shown in Table 1 above, the lithium air batteries of Examples 1 to 4 had significantly improved charge-discharge capacity efficiency and discharging voltage as compared to the lithium air battery of the Comparative Example 1. That is, an average charging voltage during the charging of each of the lithium air batteries of Examples 1 to 4 was lower than that of the lithium air battery of the Comparative Example 1.

As described above, according to the one or more of the above embodiments of the present invention, the lithium air battery includes the organic electrolyte including the organic compound capable of intercalating and deintercalating electrons involved in an electrochemical reaction. Thus, the lithium air battery with a reduced charge-discharge overvoltage and an improved energy efficiency is obtained.

It should be understood that the exemplary embodiments described herein should be considered in a descriptive sense only and not for purposes of limitation. Descriptions of features or aspects within each embodiment should typically be considered as available for other similar features or aspects in other embodiments.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A rechargeable lithium air battery comprising:
a negative electrode comprising lithium;
a positive electrode using oxygen as a positive active material; and
an organic electrolyte, wherein the organic electrolyte comprises an organic compound capable of abstracting and releasing electrons involved in an electrochemical reaction;
wherein the organic compound comprises a quinone-based compound selected from the group consisting of 1,2-benzoquinone, 1,4-benzoquinone, 1,2-naphthoquinone, 2,3-naphthoquinone, 1,4-naphthoquinone, 1,2-anthraquinone, 2,3-anthraquinone, 1,4-anthraquinone, 9,10-anthraquinone, 1,2-pyrenedione, 4,5-pyrenedione, 1,2-coronenedione, 1,2,5,6-coronenetetranone, 1,2,5,6,9,10-coronenehexanone, and 2-hydroxy-1,4-naphthoquinone.

2. The lithium air battery of claim 1, wherein the organic compound mediates electron transfer between the positive electrode and a lithium oxide.

3. The lithium air battery of claim 1, wherein the organic compound has a reduction potential ranging from about 2 to about 3.2 V with respect to lithium metal.

4. The lithium air battery of claim 1, wherein the organic compound has a conjugated system.

5. The lithium air battery of claim 1, wherein the organic compound comprises an aromatic hydrocarbon ring.

6. The lithium air battery of claim 1, wherein the amount of the organic compound in the organic electrolyte is in a range of about 0.01 mM to about 5 M.

7. The lithium air battery of claim 1, wherein the organic electrolyte comprises an aprotic solvent.

8. The lithium air battery of claim 1, wherein the organic electrolyte comprises an alkali metal salt or an alkali earth metal salt.

9. The lithium air battery of claim 8, wherein the cation of the alkali metal salt or the alkali earth metal salt is at least one cation selected from the group consisting of a lithium ion, a sodium ion, a magnesium ion, a potassium ion, a calcium ion, a rubidium ion, a strontium ion, a cesium ion, and a barium ion.

10. The lithium air battery of claim 8, wherein the anion of the alkali metal salt or the alkali earth metal salt is at least one anion selected from the group consisting of $PF_6^-$, $BF_4^-$, $SbF_6^-$, $AsF_6^-$, $C_4F_9SO_3^-$, $ClO_4^-$, $AlO_2^-$, $AlCl_4^-$, $C_xF_{2x+1}SO_3^-$ wherein x is a natural number, $(C_xF_{2x+1}SO_2)(C_yF_{2y+1}SO_2)N^-$ wherein x and y are natural numbers, and a halide.

11. The lithium air battery of claim 8, wherein the amount of the alkali metal salt or the alkali earth metal salt in the organic electrolyte is in a range of about 100 mM to about 10 M.

12. The lithium air battery of claim 1, wherein the negative electrodecomprises lithium metal, a lithium metal-based alloy, or a lithium intercalating compound.

13. The lithium air battery of claim 1, wherein the positive electrode is a conductive material.

14. The lithium air battery of claim 13, wherein the conductive material is a porous carbon-based material.

15. The lithium air battery of claim 1, wherein the positive electrode further comprises a catalyst for oxidation/reduction of oxygen.

16. The lithium air battery of claim 1, further comprising a separator disposed between the positive electrode and the negative electrode.

17. The lithium air battery of claim 1, further comprising a lithium ion conductive solid electrolyte membrane disposed between the negative electrode and the organic electrolyte.

18. A rechargeable lithium air battery comprising:
a negative electrode comprising lithium;
a positive electrode using oxygen as a positive active material; and
an organic electrolyte, wherein the organic electrolyte comprises an organic compound capable of abstracting and releasing electrons involved in an electrochemical reaction, wherein the organic compound is a quinone-based compound represented by Formula 2 below:

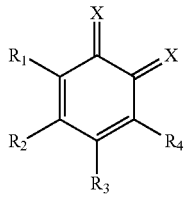

<Formula 2> wherein one X is oxygen and the other X is $C(R_a)(R_b)$—, and $R_1$, $R_2$, $R_3$, $R_4$, $R_a$, and $R_b$ are each independently hydrogen, a halogen, a cyano group, or a $C_1$-$C_{10}$ alkyl group that is unsubstituted or substituted with hydrogen, a halogen, or a cyano group, and $R_1$ and $R_2$, $R_2$ and $R_3$, and $R_3$ and $R_4$ are optionally each linked to each other to form an additionally fused ring.

19. A rechargeable lithium air battery of claim 18, at least one of $R_1$, $R_2$, $R_3$, $R_4$, $R_a$, and $R_b$ is fluorine or $C_1$-$C_{10}$ alkyl group substituted with fluorine.

20. A rechargeable lithium air battery comprising:
a negative electrode comprising lithium;
a positive electrode using oxygen as a positive active material; and
an organic electrolyte, wherein the organic electrolyte comprises an organic compound capable of abstracting and releasing electrons involved in an electrochemical reaction; wherein the organic compound comprises a quinone-based compound represented by Formula 1 below:

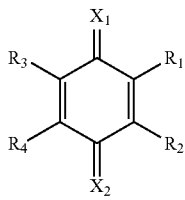

<Formula 1> wherein $X_1$ is oxygen and $X_2$ is —$C(R_a)(R_b)$—, and $R_1$, $R_2$, $R_3$, $R_4$, $R_a$, and $R_b$ are each independently hydrogen, a halogen, a cyano group, or a $C_1$-$C_{10}$ alkyl group that is unsubstituted or substituted with hydrogen, a halogen, or a cyano group, and $R_1$ and $R_2$ and $R_3$ and $R_4$ are optionally each linked to each other to form an additionally fused ring.

21. A rechargeable lithium air battery of claim 20, at least one of $R_1$, $R_2$, $R_3$, $R_4$, $R_a$, and $R_b$ is fluorine or $C_1$-$C_{10}$ alkyl group substituted with fluorine.

* * * * *